United States Patent [19]
Honji et al.

[11] Patent Number: 5,379,586
[45] Date of Patent: Jan. 10, 1995

[54] SYSTEM FOR CONTROLLING OXYGEN CONCENTRATION IN EXHAUST GAS AND EXHAUST GAS CLEANING SYSTEM EMPLOYING THE SAME

[75] Inventors: Akio Honji, Hitachi; Toshio Ogawa, Takahagi; Osamu Kuroda, Hitachi; Hisao Yamashita, Hitachi; Takahiro Tachi, Hitachi; Hiroshi Miyadera, Hitachi; Masakatsu Fujishita, Mito, all of Japan

[73] Assignee: Hitachi, Ltd., Tokyo, Japan

[21] Appl. No.: 948,265

[22] Filed: Sep. 21, 1992

[30] Foreign Application Priority Data

Sep. 20, 1991 [JP] Japan .................. 3-241273

[51] Int. Cl.⁶ .............................. F01N 3/22; F01N 3/20
[52] U.S. Cl. ...................................... 60/276; 60/286; 60/289; 60/297; 60/311
[58] Field of Search .................. 60/286, 297, 289, 290, 60/276, 285, 311; 422/169

[56] References Cited

U.S. PATENT DOCUMENTS

| | | | |
|---|---|---|---|
| 2,942,932 | 6/1990 | Elliott | 60/297 |
| 3,699,683 | 10/1972 | Tourtellotte et al. | 60/297 |
| 3,757,521 | 9/1973 | Tourtellotte et al. | 60/297 |
| 3,886,739 | 6/1975 | Lee | 60/300 |
| 4,099,377 | 7/1978 | Yoshimura et al. | 60/289 |
| 4,385,491 | 5/1983 | Sakurai et al. | 60/289 |
| 5,090,200 | 2/1992 | Arai | 60/289 |
| 5,125,231 | 6/1992 | Patil et al. | 60/297 |
| 5,142,864 | 9/1992 | Dunne | 422/169 |
| 5,184,462 | 2/1993 | Schatz | 60/297 |

FOREIGN PATENT DOCUMENTS

| | | |
|---|---|---|
| 1205980 | 6/1986 | Canada . |
| 101715 | 8/1980 | Japan . |
| 190923 | 12/1985 | Japan . |
| 68713 | 3/1988 | Japan . |
| 75327 | 3/1990 | Japan . |
| 135216 | 5/1990 | Japan . |

Primary Examiner—Ira S. Lazarus
Assistant Examiner—L. Heyman
Attorney, Agent, or Firm—Antonelli Terry, Stout & Kraus

[57] ABSTRACT

An exhaust gas cleaning system has a catalyzer provided in the exhaust passage of the engine and an adsorbent provided upstream from the catalyzer. The adsorbent temporarily adsorbs unburned hydrocarbons emitted in large amounts immediately after the engine is started. The system provides an amount of air required to substantially eliminate unburned hydrocarbons, based on the temperature of the adsorbent and the oxygen concentration in exhaust gas upstream from the catalyzer. An air supplying unit is provided upstream from the adsorbent. A temperature sensor is provided for the adsorbent. An oxygen sensor is provided at the inlet of the catalyzer. A control unit calculates the amount of air (oxygen) necessary for the catalyzer to convert the unburned hydrocarbons released from the adsorbent, based on signals from the temperature sensor and the oxygen sensor and the exhaust flow rate. The control unit accordingly controls the air supplying unit.

20 Claims, 8 Drawing Sheets

SYSTEM FOR CONTROLLING OXYGEN CONCENTRATION IN EXHAUST GAS AND EXHAUST GAS CLEANING SYSTEM EMPLOYING THE SAME

BACKGROUND OF THE INVENTION

1. Field of the Invention

The present invention relates to a system for controlling the oxygen concentration in exhaust gas and an exhaust gas cleaning system employing it, in which an adsorbent is provided either in an exhaust gas cleaning catalyzer provided in the exhaust passage of the engine or in the exhaust passage upstream from the catalyzer so that the adsorbent adsorbs unburned hydrocarbons, which are emitted in large amounts immediately after the engine is started, and releases the unburned hydrocarbons when the catalyzer has been heated to a temperature at which it becomes able to clean the exhaust gas.

2. Description of the Related Art

Generally, an engine is provided with a catalyzer connected to the exhaust passage so as to clean the exhaust gas. Such a catalyzer, however, becomes able to function only when it is heated to about 300#C or higher. Therefore, when the engine is just started, i.e., when the temperature of exhaust gas is not high enough, the catalyzer does not fully work to clean the exhaust gas. Moreover, an engine which is just started and still cold emits a lot of unburned hydrocarbons. Methods to solve such a problem are disclosed in Japanese Utility Model Unexamined Publication No. 60-190923, Japanese Patent Unexamined Publication Nos. 63-68713, 2-75327 and 2-135126, in which methods an adsorbent is used to temporarily adsorb unburned hydrocarbons and release them when the temperature of the exhaust gas rises to a sufficiently high level so that the catalyzer can fully work to clean the exhaust gas.

However, though Japanese Utility Model Unexamined Publication No. 60-190923 and Japanese Patent Unexamined Publication No. 2-75327 describe that a switch valve, which is provided in the connecting portion between the main passage and the by-pass passage provided with an adsorbent, is operated in accordance with the temperature of exhaust gas, they do not refer to treatment of the unburned hydrocarbons released from the adsorbent. Japanese Patent Unexamined Publication No. 2-135126 does not refer to controlling. Though Japanese Patent Unexamined Publication No. 63-68713 describes that a switch valve, which is provided in the connection portion between the main passage and the by-pass passage provided with an adsorbent, is operated in accordance with the temperature of exhaust gas and that a secondary supply of air is provided at least when the temperature of the adsorbent is as high as or higher than the level at which the adsorbent releases the unburned hydrocarbons, it does not refer to a method of controlling the secondary supplying of air. Further, while this Japanese Patent Publication describes that the adsorbent is cooled, for example, by using the air conditioner installed in the motor vehicle, it does not describe the control method for cooling the adsorbent.

Though a method is known in which an adsorbent is used to temporarily adsorb unburned hydrocarbons and release them when the temperature of exhaust gas becomes sufficiently high so that the catalyzer can work to clean the exhaust gas, only Japanese Patent Unexamined Publication No. 63-68713 describes how to efficiently convert the released unburned hydrocarbons by using the catalyzer, and even this specification merely tells that a secondary supply of air is provided when the temperature has reached the level at which the unburned hydrocarbons are released.

SUMMARY OF THE INVENTION

The present inventors, after exhaustive studies on exhaust gas cleaning systems employing adsorbents, have found that it is necessary to control the composition of the exhaust gas and the degree of mixing thereof at the inlet of the catalyzer, i.e., to ensure that a sufficient amount of oxygen required to convert unburned hydrocarbons into nontoxic substances is uniformly present, in order to substantially eliminate the unburned hydrocarbons released from the adsorbent using the catalyzer. Thus, they have achieved one aspect of the present invention.

Further, they have found that the adsorption rate of an adsorbent depends on the flow rate of exhaust gas. More specifically, a smaller flow rate of exhaust gas causes a greater adsorbing rate, i.e., causes the adsorbent to adsorb unburned hydrocarbons more efficiently. After considering how to reduce the exhaust flow rate, they have achieved another aspect of the present invention.

As described above, though Japanese Patent Unexamined Publication No. 63-68713 describes that the adsorbent is cooled, for example, using the air conditioner installed in the motor vehicle, it does not describe the methods of using the air conditioner and controlling the cooling of the adsorbent. The present inventors have studied a method of cooling an adsorbent and a control method thereof and achieved still another aspect of the present invention.

Accordingly, an object of the present invention is to provide an exhaust gas cleaning system in which the unburned hydrocarbons released by an adsorbent can be efficiently and substantially eliminated by a catalyzer in the exhaust passage of the engine, and a motor vehicle employing such a system.

To achieve the above object, an exhaust gas cleaning system according to the present invention comprises: a catalyzer for cleaning exhaust gas of an engine; an adsorbent which is provided upstream from the catalyzer and which adsorbs unburned hydrocarbons emitted from the engine immediately after the engine is started; an oxygen sensor for detecting the oxygen concentration upstream from the catalyzer; a temperature sensor for detecting the temperature of the adsorbent and outputting an initiation signal when the temperature of the adsorbent reaches a level at which the adsorbent releases the unburned hydrocarbons; control means which operates, in response to the initiation signal, to calculate the exhaust flow rate based on the engine speed and/or the flow rate of the air taken into the engine and calculate the amount of air necessary for the catalyzer to substantially eliminate the unburned hydrocarbons released by the adsorbent, based on the exhaust flow rate and the oxygen concentration received from the oxygen sensor; and air supplying means for supplying the amount of air calculated by the control means into the exhaust gas cleaning system upstream from the adsorbent.

Further, the present invention provides an exhaust gas cleaning system comprising a catalyzer for cleaning exhaust gas from an engine and an adsorbent for adsorbing unburned hydrocarbons, the exhaust gas cleaning system which achieves high efficiency in the catalyzer's removing of unburned hydrocarbons from exhaust gas by employing a system for controlling the oxygen concentration in exhaust gas, which controls the amount of air required to substantially eliminate the unburned hydrocarbons released from the adsorbent by using the catalyzer, in accordance with the oxygen concentration upstream from the catalyzer and the temperature of the adsorbent.

According to the present invention, when the adsorbent is heated up to a temperature at which the adsorbent starts to release the unburned hydrocarbons, the oxygen sensor detects the oxygen concentration in the exhaust gas at the inlet of the catalyzer. If the amount of oxygen is found to be insufficient to substantially eliminate the unburned hydrocarbons released from the adsorbent, a sufficient amount of oxygen is supplied into the exhaust gas. Such a control is made only when the temperature of the catalyzer is not higher than the functional temperature of the catalyzer. When the temperature of the catalyzer is as high as or higher than the functional temperature, normal air-fuel ratio control is performed in accordance with the outputs of the oxygen sensor provided at the inlet of the catalyzer.

To supply oxygen into the exhaust gas at the inlet of the catalyzer, an air supplying means may be provided upstream from the adsorbent, or the air-fuel ratio of the gas taken into the engine may be controlled so as to supply an excessively large amount of oxygen. In a system where an air supplying means is provided, the air supplying means should preferably be provided upstream from the adsorbent in order to homogeneously mix the exhaust gas with the air. A means for helping to heat the catalyzer may be provided so that the temperature thereof will unfailingly have reached the functional temperature when the adsorbent starts to release the unburned hydrocarbons. Such a means may utilize electricity or reserved heat.

The resorption rate of the unburned hydrocarbons from the adsorbent is controlled by employing a plurality of adsorbents having different release temperatures and/or providing a means for cooling the adsorbent.

To increase the adsorption efficiency of unburned hydrocarbons into the adsorbent, a flow control means is provided downstream from the adsorbent, for reducing the exhaust flow immediately after the engine is started.

Immediately after the engine is started, fuel is likely to stick to the intake valves and the cylinder walls and burn insufficiently because the engine is still cold. Further, to help start the engine smoothly, gas containing a large amount of fuel must be supplied into the engine. Therefore, a large amount of unburned hydrocarbons results in exhaust gas. When the engine is just started, the exhaust gas cleaning catalyzer (generally being a three-way catalyzer) is not yet warmed up to the functional temperature, usually 300° C., and therefore the catalyzer cannot work to convert the unburned hydrocarbons. Accordingly, in the conventional art, the amount of unburned hydrocarbons emitted during the first two minutes after the engine is started constitutes a substantially large portion of the total amount of unburned hydrocarbons emitted during the entire operation of the engine.

To comply with vehicle exhaust gas regulations which will be made stricter in the near future, the unburned hydrocarbons emitted immediately after the engine is started must be substantially eliminated. The amount of unburned hydrocarbons emitted into the atmosphere can be reduced using a conventional exhaust gas cleaning system, if the system is provided with an adsorbent which adsorbs unburned hydrocarbons emitted when the engine is just started and releases the unburned hydrocarbons when the catalyzer is warmed up to its functional temperature. However, if the oxygen concentration in exhaust gas is too low to sufficiently oxidize the unburned hydrocarbons when desorption of the unburned hydrocarbons from the adsorbent starts, some of the unburned hydrocarbons released from the adsorbent will be let out into the atmosphere without being converted.

In a method according to the present invention, after the temperature of exhaust gas is increased so that the catalyzer is warmed up to its functional temperature, the unburned hydrocarbons depart from the adsorbent, thus being substantially eliminated by means of the catalyzer, which is provided downstream from the adsorbent. More specifically, a temperature sensor is provided for detecting the temperature of the adsorbent, and an oxygen sensor is provided at the inlet of the catalyzer for detecting the oxygen concentration in exhaust gas. When the temperature of the adsorbent reaches a level at which the adsorbent releases the unburned hydrocarbons, a control means calculates the flow rate of exhaust gas of the engine based on the engine speed or the flow rate of the air taken into the engine. Based on the calculated exhaust flow rate and the oxygen concentration in exhaust gas detected at the inlet of the catalyzer, the control means calculates the amount of air necessary for the catalyzer to substantially eliminate the unburned hydrocarbons released from the adsorbent. If the amount of air (oxygen) in exhaust gas is insufficient, controlling is made to increase the amount of oxygen in the exhaust gas. In this way, the unburned hydrocarbons can be substantially eliminated by means of the catalyzer. The oxygen concentration in exhaust gas can be increased by, for example, mixing an excessively large amount of air with fuel in the intake system, or supplying an appropriate amount of air by using an air supplying means connected to the exhaust passage upstream from the adsorbent. Though air may be supplied into the exhaust passage between the adsorbent and the catalyzer, supplying air upstream from the adsorbent is more effective. If air is supplied upstream from the adsorbent, the air and exhaust gas are homogeneously mixed before reaching the catalyzer so that the cleaning efficiency of the catalyzer is increased.

If the desorption rate of the unburned hydrocarbons from the adsorbent is great, an accordingly large amount of oxygen must be present in exhaust gas in order to oxidize the unburned hydrocarbons released at such a great rate. Therefore, if the desorption rate is too great, the engine may fail to perform normally, because of too much air in the intake gas, in a system where the amount of oxygen in exhaust gas is increased by increasing the amount of air in the intake gas. In a system where the amount of oxygen in exhaust gas is increased by an air supplying means, the air supplying means must be able to supply air at a substantially great rate to meet such a great desorption rate of the unburned hydrocarbons. As a result, the air supplying means inevitably becomes large in size and requires a large amount of energy to operate.

To prevent such a great desorption rate, the present invention provides a system employing an adsorbent unit formed of adsorbents having different release temperatures so that desorption of the unburned hydrocarbons from the adsorbent unit does not suddenly occur but gradually occurs over a wide range of temperatures. The present invention also provides a system employing a means for cooling the adsorbent so that the desorption rate can be reduced by mitigating the temperature increase rate of the adsorbent. The adsorbent unit containing adsorbents having different release temperatures may be formed by mixing the adsorbents, arranging the adsorbents one after another along the flow of the exhaust gas, or arranging the adsorbents on a plane substantially perpendicular to the direction of exhaust gas. The adsorbent may be cooled by using a fan, circulating the coolant of the engine or oil (for example, the transmission oil), circulating the fuel, or supplying air at atmospheric temperature from an air supplying means into the exhaust passage upstream from the adsorbent.

In a system which efficiently oxidizes the unburned hydrocarbons released from the adsorbent by increasing the oxygen concentration in exhaust gas, the amount of air required for such oxidation is calculated on the signals from the oxygen sensor provided at the inlet of the catalyzer. In a normal type motor vehicle, an oxygen sensor is provided at the inlet of the catalyzer in order to maintain a high cleaning efficiency of the catalyzer. Because the maximum cleaning efficiency can be obtained approximately at the theoretical air-fuel ratio, the air-fuel ratio of the intake gas is maintained approximately at the theoretical air-fuel ratio by using this oxygen sensor.

Therefore, according to the present invention, the above-described oxygen sensor can be used to detect the oxygen concentration in the exhaust gas at the inlet of the catalyzer when desorption of the unburned hydrocarbons from the adsorbent starts. Based on the signal outputted by the oxygen sensor when the adsorbent is heated to its release temperature and the exhaust flow rate calculated on the engine speed or the flow rate of the intake air, the control means calculates the amount of air required to substantially eliminate the unburned hydrocarbons, and makes a command to appropriately supply air into exhaust gas. In a system which increases the amount of air in exhaust gas by controlling the air-fuel ratio, i.e., supplying an increased amount of air into the engine, the conventional air-fuel control can be used to supply an increased amount of air into the engine until the temperature of the adsorbent reaches the level at which desorption of the unburned hydrocarbons from the adsorbent is completed. On the other hand, in a system which supplies air into exhaust gas using an air supplying means, the air-fuel ratio control using the oxygen sensor is temporarily stopped, and then restarted when the temperature of the adsorbent reaches the level at which the desorption is completed.

Though the catalyzer and the adsorbent have been described as separate units hereinbefore, an adsorbent may be mixed into a catalyzer to form a catalyzer unit capable of adsorption.

Further, according to the present invention, a flow control valve is provided for helping the adsorbent efficiently adsorb unburned hydrocarbons emitted when the engine is just started. If the flow control valve reduces the flow rate of the exhaust gas passing the adsorbent, the period during which the molecules or particles of unburned hydrocarbons are in contact with the adsorbent is elongated, thus resulting in an increased adsorption efficiency.

Still further, the present invention provide a system having a bypass exhaust passage which is provided with an adsorbent. In such a system, exhaust gas flows through the bypass passage only when the engine is just started, and after adsorption of unburned hydrocarbons into the adsorbent is completed, exhaust gas flows through the main passage. Further, the combination of an adsorbent for water and an adsorbent for unburned hydrocarbons may be employed. Still further, an adsorbent unit containing a substance which is actively involved in oxidation of hydrocarbons may be used according to the present invention.

Though the exhaust flow rate is calculated on the engine speed or the flow rate of the intake air in the above, the exhaust flow rate may be directly detected.

Further objects, features and advantages of the present invention will become apparent from the following description of the preferred embodiments with reference to the attached drawings.

DESCRIPTION OF THE PREFERRED EMBODIMENTS

[Embodiment 1]

Figure 1:
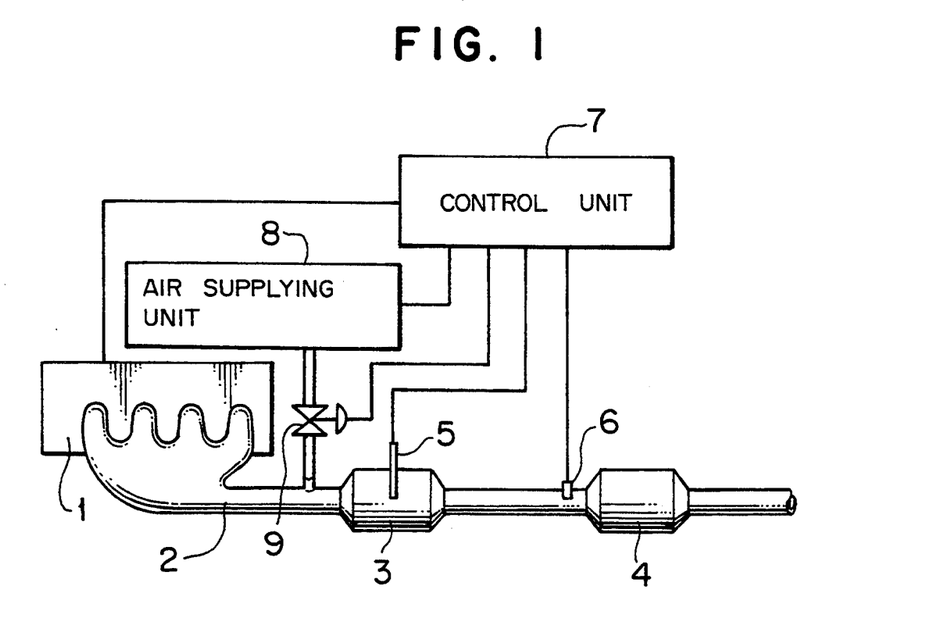
FIG. 1 illustrates an exhaust gas cleaning system according to Embodiment 1 of the present invention.

Referring to FIG. 1, an exhaust gas cleaning system according to Embodiment 1 of the present invention comprises: a general-type three-way catalyzer 4 (having a capacity of 1.0 liter) provided in an exhaust passage 2 from a gasoline engine 1, an adsorbent unit 3 provided upstream from the three-way catalyzer 4 (referred to as the "catalyzer 4" hereinafter), and an oxygen sensor 6 provided in the exhaust passage near the inlet of the catalyzer 4. The adsorbent unit 3 was formed as follows. A slurry was prepared by mixing H-type mordenite powder, alumina sol and water. Using this slurry, a cordierite monolithic support (having a capacity of 1.0 liter and cells of $400/in^2$) was coated. The coated monolithic support was dried at 100° C. for one hour and then calcined at 500° C. for three hours. This process of coating, drying and then baking was repeated until the total amount of the H-type mordenite reached 140 g/liter.

An air supplying unit 8 is connected by way of a variable flow control valve 9 to the exhaust passage upstream from the adsorbent unit 3. A temperature sensor 5 is provided on the adsorbent unit 3. A control unit 7 receives signals from the temperature sensor 5 and the oxygen sensor 6 and calculates the flow rate of the exhaust gas based on the engine speed. In accordance with these signals and the exhaust gas flow rate, the control unit 7 controls the air supplying unit 8 and the flow control valve 9.

The temperature sensor 5 generates a signal when the temperature of the adsorbent unit 3 reaches the level at which desorption of the unburned hydrocarbons adsorbed in the adsorbent unit 3 starts. Responding to this signal, the control unit 7 calculates the amount of air (oxygen) required to burn the unburned hydrocarbons released from the adsorbent unit 3, based on the oxygen concentration detected by the oxygen sensor 6 and the exhaust gas flow rate calculated from the engine speed. If the amount of oxygen in the exhaust gas is insufficient, the control unit 7 operates the air supplying unit 8 and the flow control valve 9 so as to increase the amount of oxygen in the exhaust gas. Thus, the unburned hydrocarbons released from the adsorbent unit 3 can be substantially eliminated by the catalyzer 4. Since the exhaust gas is thoroughly mixed with a sufficient amount of air supplied therein, the conversion at the catalyzer 4 can be increased.

When the temperature of the adsorbent unit 3 reaches the level at which the desorption of the unburned hydrocarbons is completed, the temperature sensor 5 generates a signal. Responding to this signal, the control unit 7 stops the air supplying unit 8. When the temperature of the adsorbent unit 3 is at the level at which the desorption of the unburned hydrocarbons is completed, or higher than such level, the control unit 7 controls the air-fuel ratio of the gas taken into the engine 1, in accordance with a signal from the oxygen sensor 6. Alternatively, the exhaust gas flow rate may be calculated by the control unit 7, based on the flow rate of the air taken into the engine 1.

[Embodiment 2]

Figure 2:
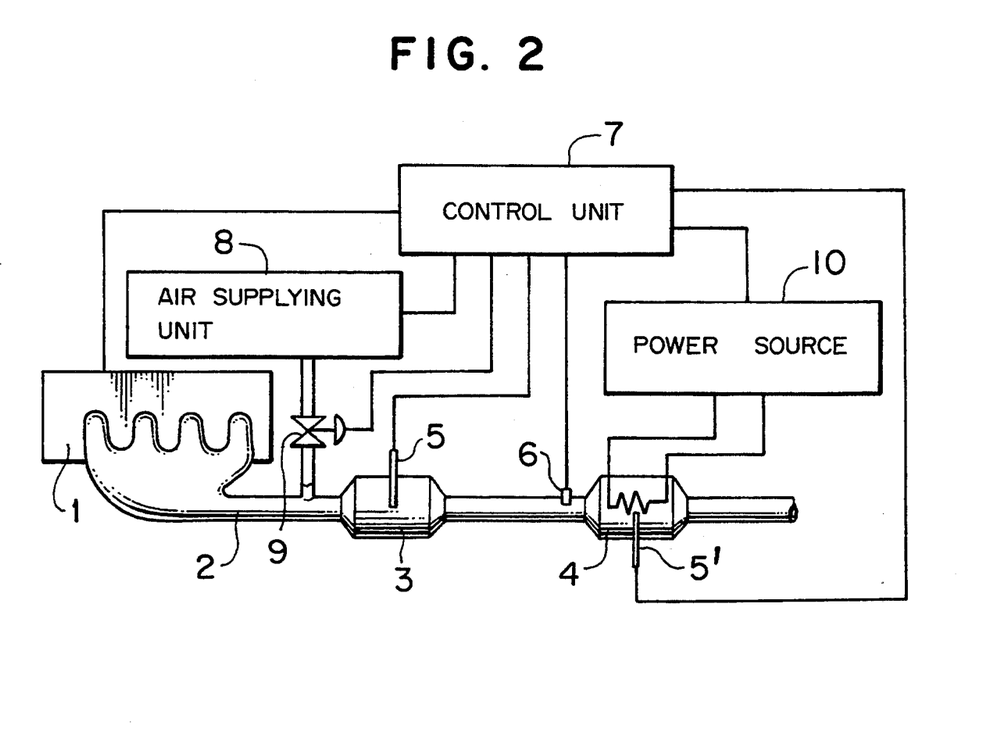
FIG. 2 illustrates an exhaust gas cleaning system according to Embodiment 2 of the present invention.

An exhaust gas cleaning system according to Embodiment 2 of the present invention is shown in FIG. 2. This embodiment differs from Embodiment 1 in that a catalyzer 4 can be electrically heated. A power source 1 for electrically heating the catalyzer 4 is connected to a control unit 7. A power source 10 is controlled utilizing a temperature sensor 5 provided on an adsorbent unit 3 and another temperature sensor 5' provided on the catalyzer 4. More specifically, based on the temperature-increase characteristic which is obtained by monitoring the temperatures of the adsorbent unit 3 and the catalyzer 4 after the engine 1 is started, the control unit 7 controls the output of the power source 10 so that when the temperature of the adsorbent unit 3 reaches the level at which the desorption of the unburned hydrocarbons starts, the temperature of the catalyzer 4 will have reached the activation temperature of the catalyzer 4. The conversion at the catalyzer 4 can be thus increased. Other features of this embodiment are substantially the same as those of Embodiment 1.

[Embodiment 3]

Figure 3:
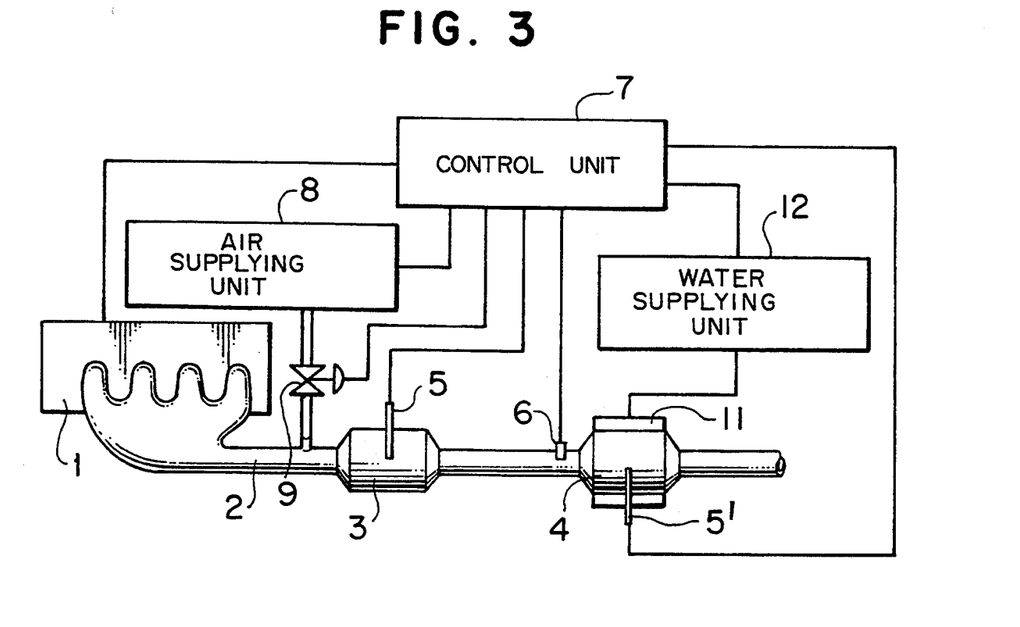
FIG. 3 illustrates an exhaust gas cleaning system according to Embodiment 3 of the present invention.

An exhaust gas cleaning system according to Embodiment 3 of the present invention is shown in FIG. 3. Instead of the power source 10 in Embodiment 2, a catalyzer 4 in this embodiment is provided with a heat reserving unit 11 and a water supplying unit 12 for supplying water to the heat reserving unit 11. The heat reserving unit 11 employs calcium oxide (CaO). To increase the temperature of the catalyzer 4, water is added to the calcium oxide. Reaction heat is generated when calcium oxide changes into calcium hydroxide ($Ca(OH)_2$). When the engine is normally operated, i.e., when the temperature of the catalyzer 4 is high, the calcium hydroxide in the heat reserving unit 11 changes back into calcium oxide, which can be used again to heat the catalyzer 4. A control unit 7 detects the rate of temperature increase after the engine 1 is started, using a temperature sensor 5 provided on an adsorbent unit 3 and another temperature sensor 5' provided on the catalyzer 4. Based on this temperature increase rate, the control unit calculates the appropriate time to add water and an appropriate amount of water to add, and then commands the water supplying unit 12 to add water accordingly, so that when the temperature of the adsorbent unit 3 reaches the lever at which the desorption of the unburned hydrocarbons starts, the temperature of the catalyzer 4 will have reached the activation temperature of the catalyzer 4. Other features of this embodiment are substantially the same as those of Embodiment 1.

Though the heat reserving unit in this embodiment utilizes reaction heat to heat the catalyzer, other types of heat reserving means may be employed. For example, a heat reserving means utilizing latent heat, such as latent heat during a solid-liquid phase change, or a heat reserving means employing a substance having a large heat capacity. In an exhaust gas cleaning system employing such a heat reserving means, the heat reserving means and the catalyzer are arranged so that the heat reserving means receives and reserves heat when the catalyzer is at a high temperature. Further, thermal insulation is employed to minimize heat radiation, i.e., to minimize a temperature decrease in the catalyzer when the engine is stopped. In this way, the temperature of the catalyzer can be kept substantially high for re-starting of the engine.

[Embodiment 4]

Figure 4:
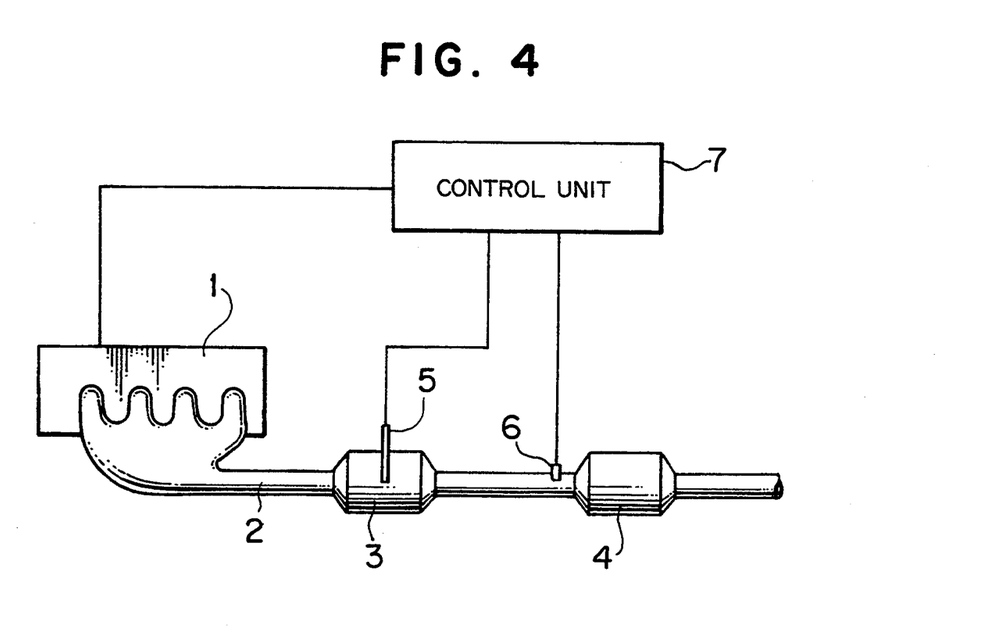
FIG. 4 illustrates an exhaust gas cleaning system according to Embodiment 4 of the present invention.

Referring to FIG. 4, an exhaust gas cleaning system according to Embodiment 4 of the present invention comprises: a general-type three-way catalyzer (having a capacity of 1.0 liter) provided in an exhaust passage 2 from a gasoline engine 1, an adsorbent unit 3 provided upstream from the catalyzer 4, and an oxygen sensor 6 provided in the exhaust passage near the inlet of the catalyzer 4. The adsorbent unit 3 was formed as follows.

A slurry was prepared by mixing H-type mordenite powder, alumina sol and water. Using this slurry, a cordierite monolithic support (having a capacity of 1.0 liter and cells of 400/in$^2$) was coated. The coated monolithic support was dried at 100° C. for one hour and then calcined at 500° C. for three hours. This process of coating, drying and then calcining was repeated until the total amount of the H-type mordenite reached 140 g/liter. A temperature sensor 5 is provided on the adsorbent unit 3. A control unit 7 receives signals from the temperature sensor 5 and the oxygen sensor 6 and the flow rate of the exhaust gas which is calculated from the engine speed. In accordance with these signals and the exhaust gas flow rate, the control unit 7 controls the air-fuel ratio of the intake gas so that an excessive amount of air is supplied and controls the excessive amount of air at an appropriate level.

Though the exhaust flow rate is calculated in this embodiment from the engine speed, it may be calculated from the flow rate of the air taken into the engine.

[Embodiment 5]

Figure 5:
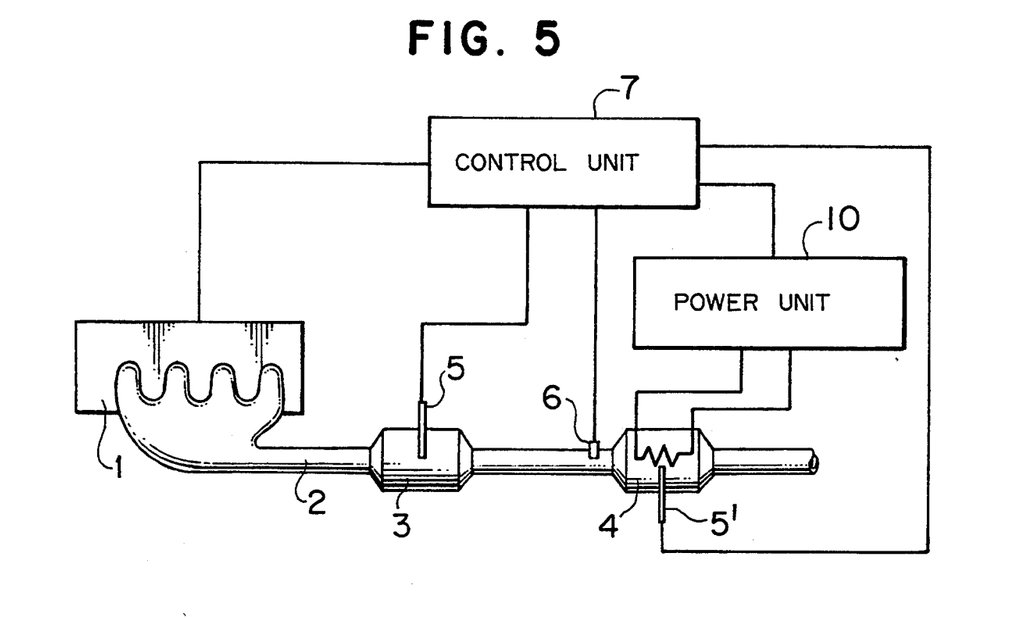
FIG. 5 illustrates an exhaust gas cleaning system according to Embodiment 5 of the present invention.

An exhaust gas cleaning system according to Embodiment 5 of the present invention is shown in FIG. 5. This embodiment differs from Embodiment 4 in that a catalyzer 4 can be electrically heated. A power source 1 for electrically heating the catalyzer 4 is connected to a control unit 7. The power source 10 is controlled utilizing a temperature sensor 5 provided on an adsorbent unit 3 and another temperature sensor 5' provided on the catalyzer 4. More specifically, based on the temperature-increase characteristic which is obtained by monitoring the temperatures of the adsorbent unit 3 and the catalyzer 4 after the engine 1 is started, the control unit 7 controls the output of the power source 10 so that when the temperature of the adsorbent unit 3 reaches the level at which the desorption of the unburned hydrocarbons starts, the temperature of the catalyzer 4 will have reached the activation temperature of the catalyzer 4. Other features of this embodiment are substantially the same as those of Embodiment 4.

[Embodiment 6]

Figure 6:
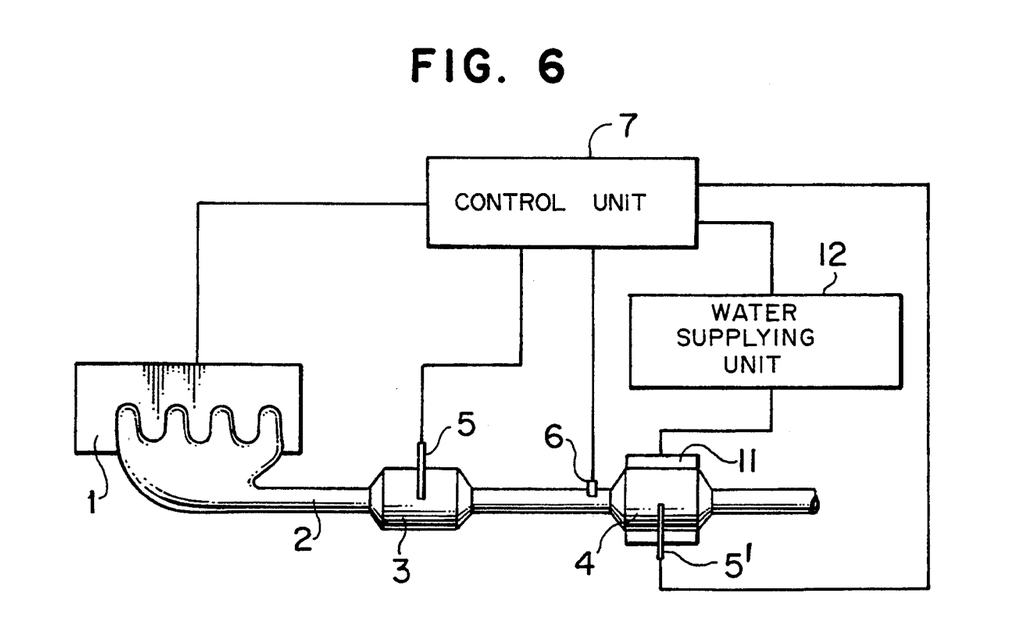
FIG. 6 illustrates an exhaust gas cleaning system according to Embodiment 6 of the present invention

An exhaust gas cleaning system according to Embodiment 6 of the present invention is shown in FIG. 6. This embodiment differs from Embodiment 4 in that a catalyzer 4 is provided with a heat reserving unit 11 and a water supplying unit 12 for supplying water to the heat reserving unit 11. The heat reserving unit 11 employs calcium oxide (CaO). To increase the temperature of the catalyzer 4, water is added to the calcium oxide. Reaction heat is generated when calcium oxide changes into calcium hydroxide (Ca(OH)$_2$). When the engine is normally operated, i.e., when the temperature of the catalyzer 4 is high, the calcium hydroxide in the heat reserving unit 11 changes back into calcium oxide, which can be used again to heat the catalyzer 4. A control unit 7 detects the rate of temperature increase after the engine 1 is started, using a temperature sensor 5 provided on an adsorbent unit 3 and another temperature sensor 5' provided on the catalyzer 4. Based on this temperature increase rate, the control unit calculates the appropriate time to add water and an appropriate amount of water to add, and then commands the water supplying unit 12 to add water accordingly, so that when the temperature of the adsorbent unit 3 reaches the lever at which the desorption of the unburned hydrocarbons starts, the temperature of the catalyzer 4 will have reached the activation temperature of the catalyzer 4. Other features of this embodiment are substantially the same as those of Embodiment 4.

Though the heat reserving unit in this embodiment utilizes reaction heat to heat the catalyzer, other types of heat reserving means may be employed. For example, a heat reserving means utilizing latent heat, such as latent heat during a solid-liquid phase change, or a heat reserving means employing a substance having a large heat capacity. In an exhaust gas cleaning system employing such a heat reserving means, the heat reserving means and the catalyzer are arranged so that the heat reserving means receives and reserves heat when the catalyzer is at a high temperature. Further, thermal insulation is employed to minimize heat radiation, i.e., to minimize a temperature decrease in the catalyzer when the engine is stopped. In this way, the temperature of the catalyzer can be kept substantially high for re-starting of the engine.

[Embodiment 7]

Figure 7:
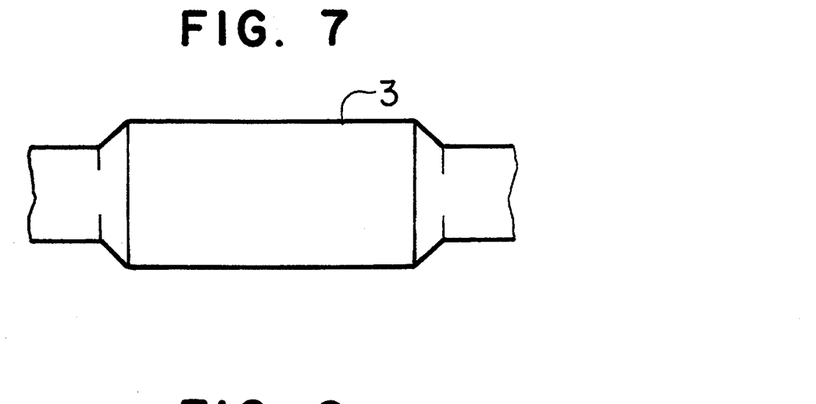
FIG. 7 illustrates an adsorbing unit having three different kinds of adsorbents employed in an exhaust gas cleaning system according to the invention.

FIG. 7 shows the arrangement of different kinds of adsorbents according to Embodiment 7 of the present invention. An adsorbent unit 3 was formed as follows. Equal weights of H-type mordenite powder, Na-type mordenite powder and Na-type zeolite 13X powder were mixed. A slurry was prepared by mixing this mixture with alumina sol and water. Using this slurry, a cordierite monolithic support (having a capacity of 1.0 liter and cells of 400/in$^2$) was coated. The coated monolithic support was dried at 100° C. for one hour and then calcined at 500° C. for three hours. This process of coating, drying and then calcining was repeated until the total amount of the H-type mordenite, the Na-type mordenite and the Na-type zeolite 13X reached 140 g/liter. This adsorbent unit 3 is incorporated into substantially the same system as shown in FIG. 1. Controlling is performed in this embodiment in substantially the same way as in Embodiment 1.

[Embodiment 8]

Figure 8:
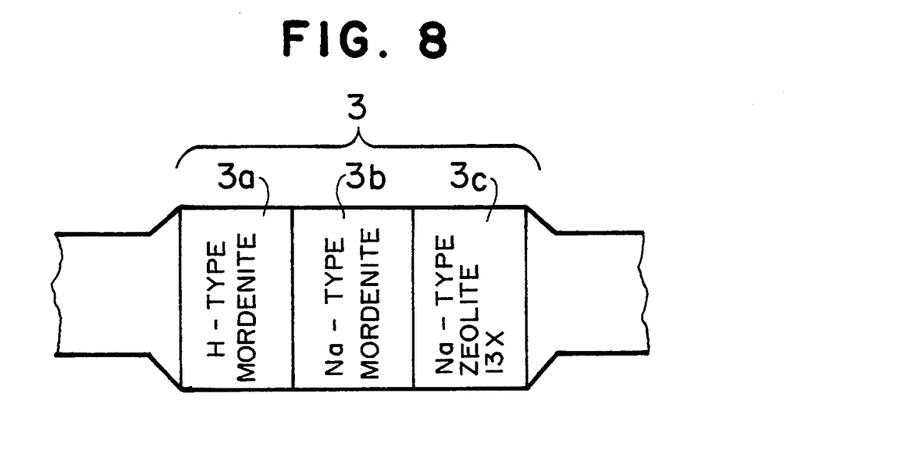
FIG. 8 illustrates an adsorbing unit comprising three kinds of adsorbents linearly arranged in series.

FIG. 8 shows the arrangement of different kinds of adsorbents according to Embodiment 8 of the present invention. An adsorbent unit 3 was formed as follows. H-type mordenite powder, Na-type mordenite powder and Na-type zeolite 13X powder were separately mixed with alumina sol and water to form three different slurries containing equal weights of the respective powders. As shown in FIG. 8, a cordierite monolithic support (having a capacity of 1.0 liter and cells of 400/in$^2$) was divided into three parts. The part close to the exhaust inlet was coated with the slurry containing H-type mordenite powder, the part in the middle with the slurry containing Na-type mordenite powder, and the part close to the exhaust outlet with the slurry containing Na-zeolite 13X powder. The monolithic support including the three coated parts was dried at 100° C. for one hour and then calcined at 500° C. for three hours. This process of coating, drying and then calcining was repeated until the amounts of the H-type mordenite, the Na-type mordenite and the Na-type zeolite 13X on the monolithic support each reached 140 g/liter. This adsorbent unit 3 is incorporated into substantially the same system as shown in FIG. 1. Controlling is performed in this embodiment in substantially the same way as in Embodiment 1.

H-type mordenite in the part 3a has the highest temperature of releasing hydrocarbons of the three adsorbents, and Na-type mordenite in the part 3b has the second highest, and Na-type zeolite has the lowest. As shown in FIG. 8, these adsorbents are arranged from the inlet to the outlet of the adsorbent unit 3, in the descending order of such temperatures. Therefore, as the temperature of the adsorbent unit 3 rises, the unburned hydrocarbons starts to depart first from the part 3c close to the outlet, then from the middle part 3b and finally from the part 3a close to the inlet. Thus, the hydrocarbons released from the upstream parts 3a and 3b is let out from the adsorbent unit 3 without being adsorbed in the downstream part 3c.

[Embodiment 9]

Figure 9A:
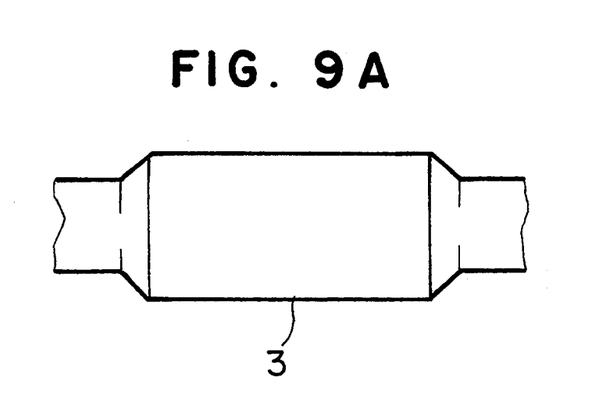
FIGS. 9A and 9B illustrate another adsorbing unit comprising three kinds of adsorbents radially arranged in rows.
Figure 9B:
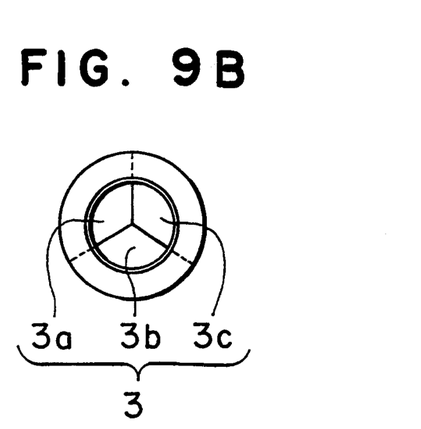

FIGS. 9A and 9B show the arrangement of different kinds of adsorbents according to Embodiment 8 of the present invention. An adsorbent unit 3 was formed as follows. H-type mordenite powder, Na-type mordenite powder and Na-type zeolite 13X powder were separately mixed with alumina sol and water to form three different slurries containing equal weights of the respective powders. As shown in FIG. 9B, a cordierite monolithic support (having a capacity of 1.0 liter and cells of 400/in$^2$) was radially divided into three parts. These three parts were separately coated with the slurry containing H-type mordenite powder, the slurry containing Na-type mordenite powder or Na-type zeolite 13X powder. The monolithic support including the three coated parts was dried at 100° C. for one hour and then calcined at 500° C. for three hours. This process of coating, drying and then calcining was repeated until the amounts of the H-type mordenite, the Na-type mordenite and the Na-type zeolite 13X on the monolithic support each reached 140 g/liter. This adsorbent unit 3 is incorporated into substantially the same system as shown in FIG. 1. Controlling is performed in this embodiment in substantially the same way as in Embodiment 1.

[Embodiment 10]

Figure 10:
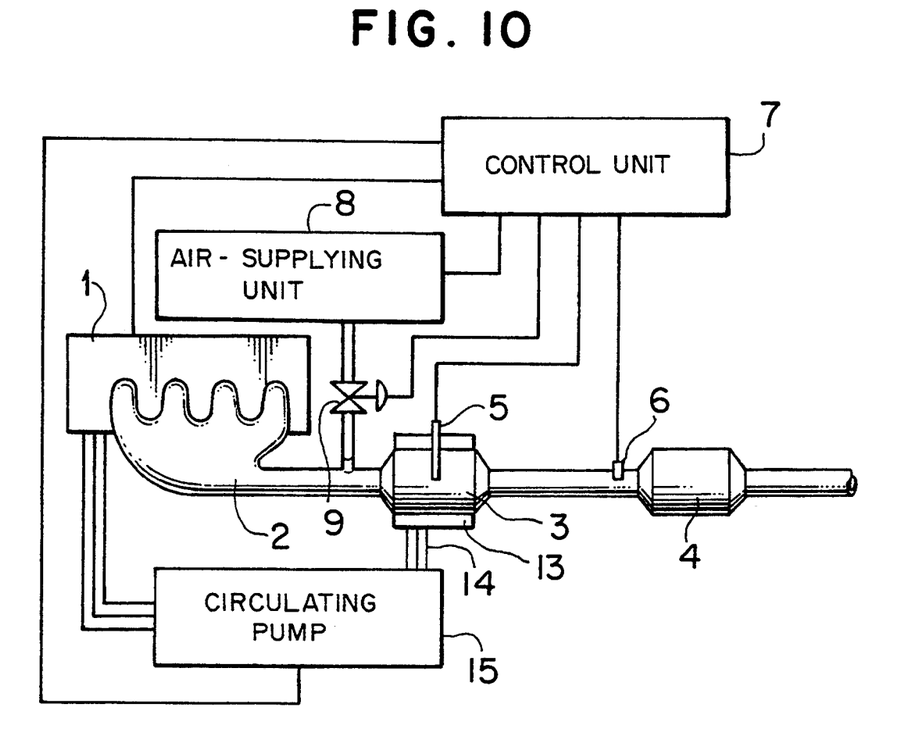
FIG. 10 illustrates an exhaust gas cleaning system according to Embodiment 10 of the present invention.

An exhaust gas cleaning system according to Embodiment 10 of the present invention is shown in FIG. 10. A cooling unit 13 is provided for cooling an adsorbent unit 3 in substantially the same system as in Embodiment 1. The cooling unit 13 is supplied with the coolant of the engine 1 through a coolant passage 14 by means of a circulating pump 15. The circulating pump 15 is connected to a control unit 7 so as to be operated when the temperature of the adsorbent unit 3 reaches the level at which the unburned hydrocarbons depart from the adsorbent unit 3. More specifically, the control unit 7 operates the circulating pump 15 in response to a signal generated by a temperature sensor which is provided on the adsorbent unit 3. Other features of this embodiment are substantially the same as those of Embodiment 1.

[Embodiment 11]

Figure 11:
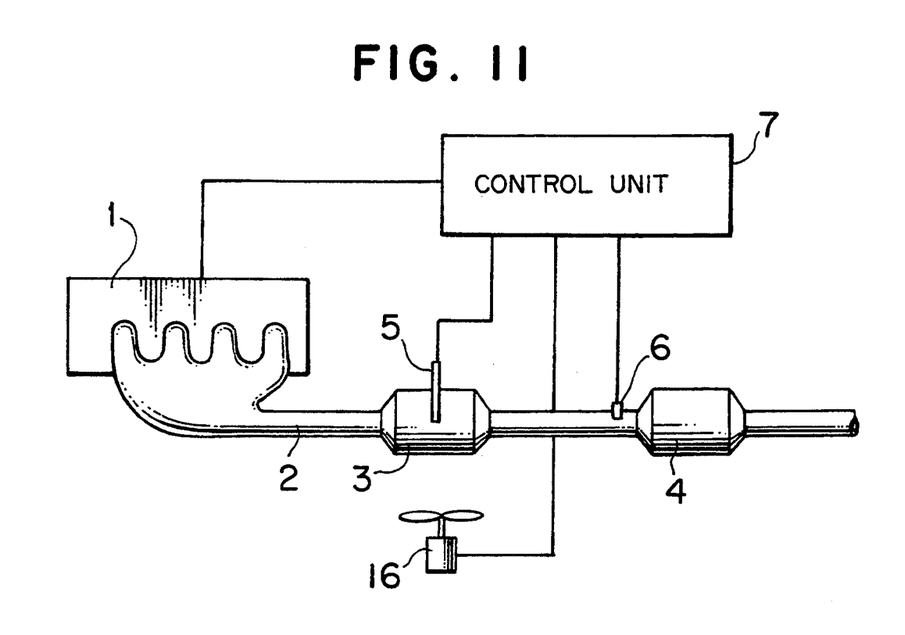
FIG. 11 illustrates an exhaust gas cleaning system according to Embodiment 11 of the present invention.

An exhaust gas cleaning system according to Embodiment 11 of the present invention is shown in FIG. 11. A cooling fan 16 is provided for cooling an adsorbent unit 3 in substantially the same system as in Embodiment 4. The cooling fan 16 is connected to a control unit 7 so as to be operated when the temperature of the adsorbent unit 3 reaches the level at which the unburned hydrocarbons depart from the adsorbent unit 3. More specifically, the control unit 7 operates the cooling fan 16 in response to a signal generated by a temperature sensor which is provided on the adsorbent unit 3. Other features of this embodiment are substantially the same as those of Embodiment 4.

[Embodiment 12]

Figure 12:
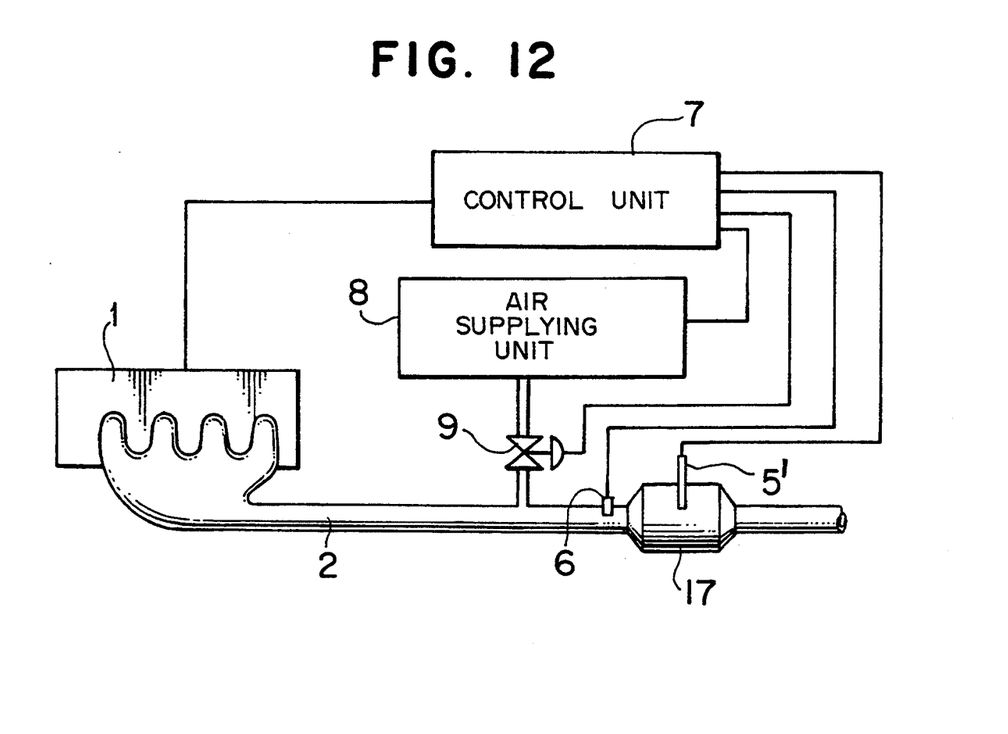
FIG. 12 illustrates an exhaust gas cleaning system according to Embodiment 12 of the present invention.

An exhaust gas cleaning system according to Embodiment 12 of the present invention is shown in FIG. 12. A three-way catalyzer 17 also capable of adsorption is provided in the exhaust passage 2 of the gasoline engine 1. An oxygen sensor 6 is provided upstream from the catalyzer 17. An air supplying unit 8 is connected by way of a variable flow control valve 9 to the exhaust passage 2 upstream from the catalyzer 17. A temperature sensor 5' is provided on the catalyzer 17. The three-way catalyzer 17 capable of adsorption was formed as follows. H-type mordenite powder, alumina powder, alumina sol and water were mixed to form a slurry. A cordierite monolithic support (having a capacity of 1.3 liter and cells of 400/in$^2$) was coated with this slurry. The coated cordierite monolithic support was dried at 100° C. for one hour, calcined at 500° C. for three hours, and then impregnated with platinum and rhodium. The process of slurry, coating, drying and then calcining was repeated until the amount of the H-type mordenite supported on the cordierite monolithic support reached 70 g/liter. The amounts of the platinum and the rhodium supported thereon were 1.0 g/liter and 0.1 g/liter, respectively.

A control unit 7 takes in signals from the temperature sensor 5' and the oxygen sensor 6 and calculates the exhaust flow rate from the engine speed. Based on these signals and the exhaust flow rate, the control unit 7 controls the air supplying unit 8 and the flow control valve 9. In this system, unburned hydrocarbons emitted from the engine 1 is adsorbed into the catalyzer 17 capable of adsorption immediately after the engine 1 is started. When the catalyzer 17 has been heated to a temperature at which the catalyzer 17 starts to release the unburned hydrocarbons, the control unit 7 calculates the amount of air required to sufficiently oxidize the unburned hydrocarbons released, and commands the air supplying unit 8 and the flow control valve 9 to accordingly supply air into the exhaust passage 2 so as to promote the exhaust gas cleaning by the catalyzer 17.

When the temperature of the catalyzer 17 reaches a level at which desorption of the unburned hydrocarbons is completed, the control unit 7 stops supplying air and controls the air-fuel ratio of the intake gas, in response to a signal from the oxygen sensor 6. Though exhaust flow rate is calculated from the engine speed in this embodiment, it may be calculated from the flow rate of the air taken into the engine 1. Further, during desorption of the unburned hydrocarbons from the catalyzer, an excessive amount of air may be supplied into the engine so that a sufficient amount of oxygen required to oxidize the unburned hydrocarbons will remain in the exhaust gas, as in Embodiment 4.

[Embodiment 13]

Figure 13:
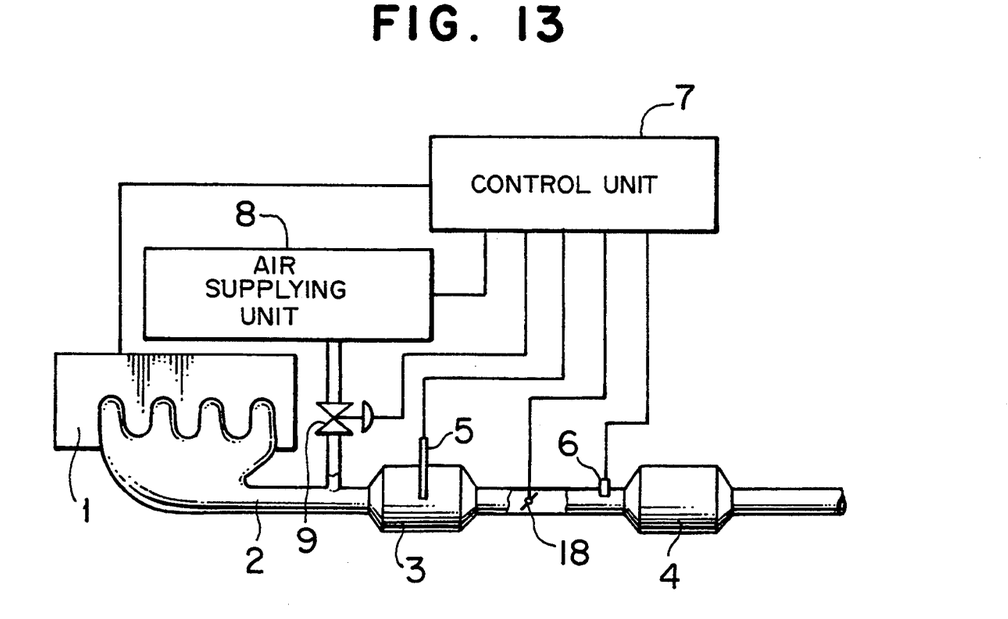
FIG. 13 illustrates an exhaust gas cleaning system according to Embodiment 13 of the present invention.

An exhaust gas cleaning system according to Embodiment 13 of the present invention is shown in FIG. 13. This embodiment differs from Embodiment 1 in that an exhaust flow control valve 18 is provided between an adsorbent unit 3 and a catalyzer 4. In a system without such a valve, not all the unburned hydrocarbons, which is emitted from the engine just started, can be adsorbed by the adsorbent unit, but some is allowed to go through the adsorbent unit to the catalyzer, because the exhaust flow rate is too great, i.e., exhaust gas flows through the adsorbent unit in too short a period for complete adsorption of the unburned hydrocarbons to occur. The exhaust flow control valve 18 in this embodiment reduces the exhaust flow rate, i.e., causes exhaust gas to flow slowly through the adsorbent unit 3. The efficiency of adsorbing unburned hydrocarbons can be thus enhanced. Control during desorption of the unburned hydrocarbons are performed in substantially the same way as in Embodiment 1.

[Embodiment 14]

Figure 14:
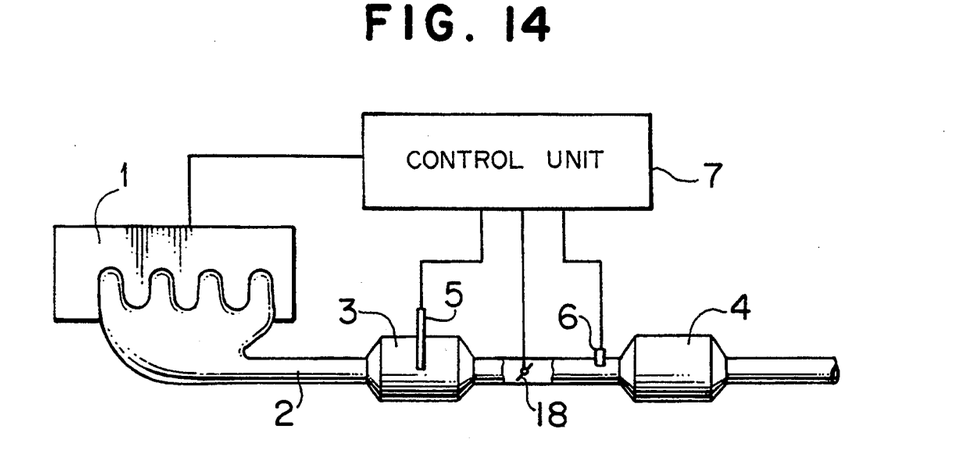
FIG. 14 illustrates an exhaust gas cleaning system according to Embodiment 14 of the present invention.

An exhaust gas cleaning system according to Embodiment 14 of the present invention is shown in FIG. 14. This embodiment differs from Embodiment 4 in that an exhaust flow control valve 18 is provided between an adsorbent unit 3 and a catalyzer 4. In a system without such a valve, not all the unburned hydrocarbons, which is emitted from the engine just started, can be adsorbed by the adsorbent unit, but some is allowed to go through the adsorbent unit to the catalyzer, because the exhaust flow rate is too great, i.e., exhaust gas flows through the adsorbent unit in too short a period for complete adsorption of the unburned hydrocarbons to occur. The exhaust flow control valve 18 in this embodiment reduces the exhaust flow rate, i.e., causes exhaust gas to flow slowly through the adsorbent unit 3. The efficiency of adsorbing unburned hydrocarbons can be thus enhanced. Control during desorption of the unburned hydrocarbons are performed in substantially the same way as in Embodiment 4.

[Comparative Example 1]

Figure 15:
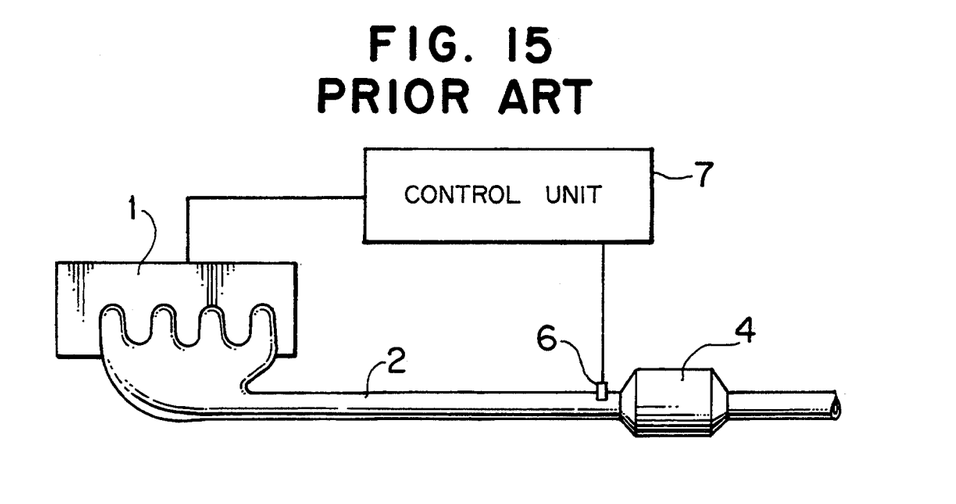
FIG. 15 illustrates a conventional exhaust gas cleaning system as Comparative Example 1.

FIG. 15 shows an exhaust gas cleaning system according to the conventional art, as Comparative Example 1 in the present invention. A three-way catalyzer 4 (having a capacity of 1.0 liter) which is generally used in a motor vehicle is provided in the exhaust passage 2 of the gasoline engine 1. An oxygen sensor 6 is provided upstream from the catalyzer 4. A control unit 7 takes in signals from the oxygen sensor 6 and, based on the signals, maintains the air-fuel ratio in the intake gas approximately at the theoretical air-fuel ratio.

[Comparative Example 2]

Figure 16:
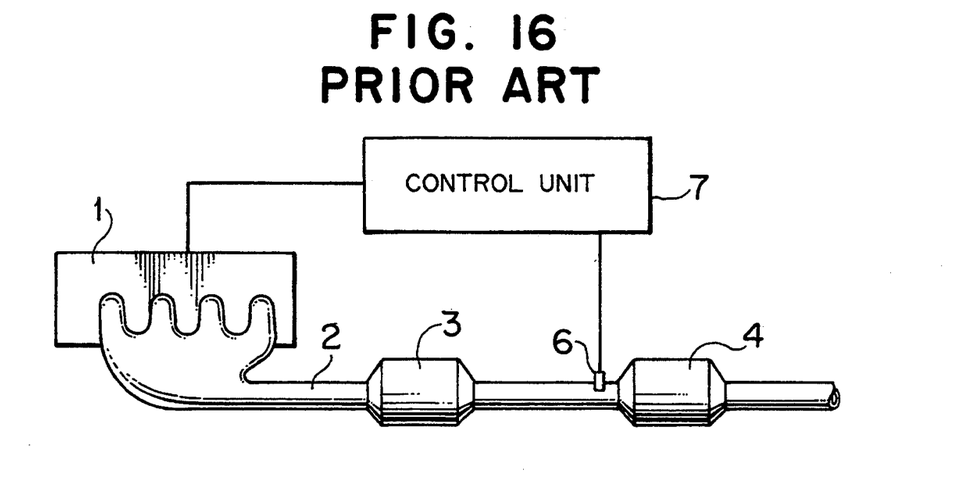
FIG. 16 illustrates another conventional exhaust gas cleaning system as Comparative Example 2.

FIG. 16 shows an exhaust gas cleaning system according to the conventional art, as Comparative Example 2 in the present invention. A three-way catalyzer 4 (having a capacity of 1.0 liter) which is generally used in a motor vehicle is provided in the exhaust passage 2 of the gasoline engine 1. An adsorbent unit 3 is provided upstream from the catalyzer 4. An oxygen sensor 6 is provided in the exhaust passage 2 near the inlet of the catalyzer 3. A control unit 7 takes in signals from the oxygen sensor 6 and, based on these signals, maintains the air-fuel ratio in the intake gas approximately at the theoretical air-fuel ratio. The adsorbent 3 is substantially the same as that used in Embodiment 1.

[Test]

Figure 17:
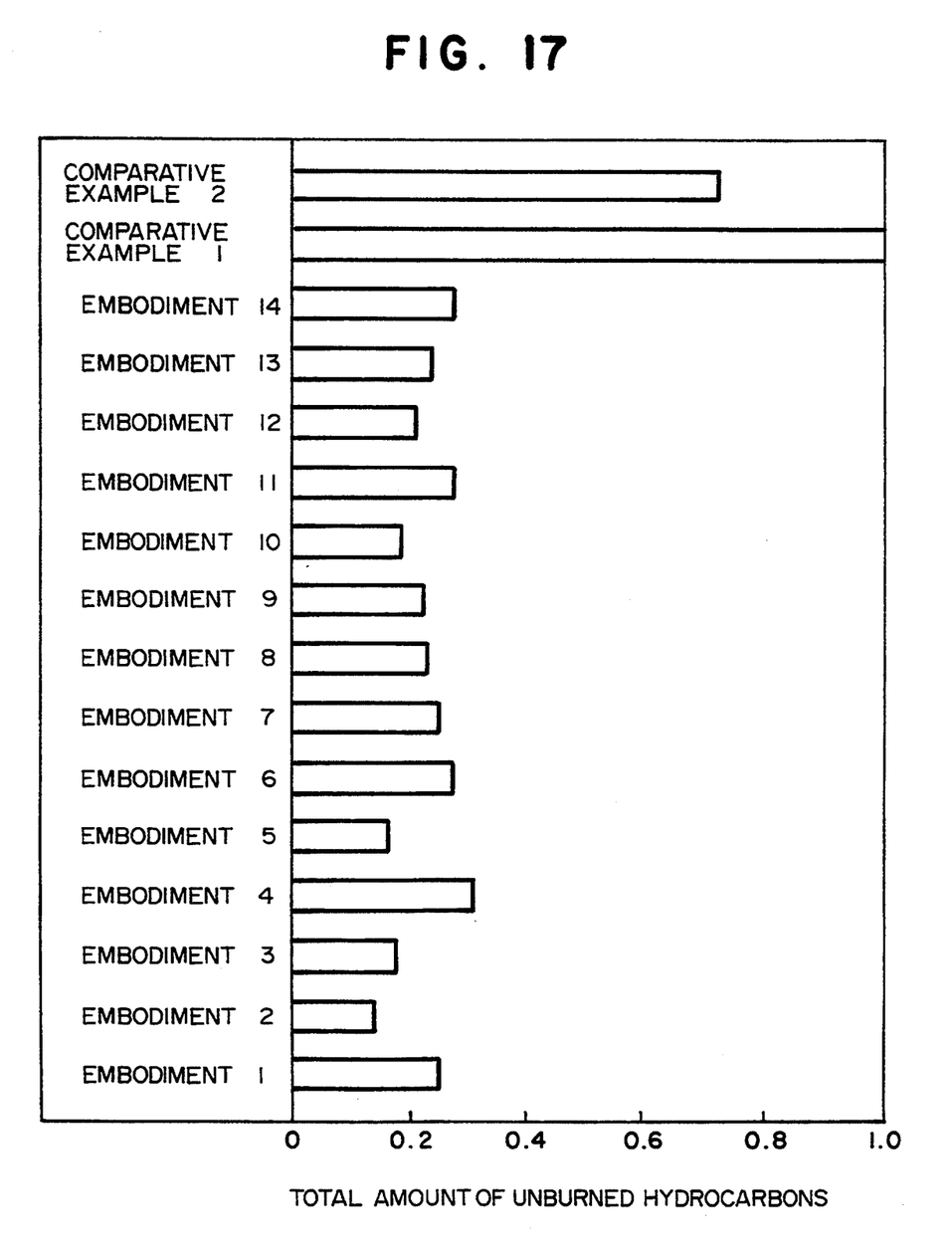
FIG. 17 shows the amounts of unburned hydrocarbons let out from Embodiments 1 to 14 relative to those from Comparative Examples 1 and 2 in an exhaust gas clarification test.

To compare the exhaust gas cleaning performances of Embodiments 1 to 14 with those of Comparative Examples 1 and 2, a cold start test was performed using an engine bench. Before performing the test, the engines were let to stand for 12 hours or more after being stopped. Then, the engines were started, idled, accelerated and let to run at 60 km/h. The unburned hydrocarbons emitted from the engines during the test was analyzed. The exhaust gas cleaning performances of the tested systems were evaluated by comparing the amounts of the unburned hydrocarbons let out from the systems during the test. The results are shown in FIG. 17. The horizontal axis of the graph in FIG. 17 indicates the total amounts of the unburned hydrocarbons let out during the test, using values relative to the total amount of the unburned hydrocarbons let out from the system of Comparative Example 1 being defined as 1. As indicated by the graph, the exhaust gas cleaning systems according to the present invention let out only about one third of the amounts of unburned hydrocarbons let out from the systems of Comparative Examples 1 and 2. This strongly supports the idea of the present invention that a sufficient amount of air supplied during desorption of the unburned hydrocarbons from the adsorbent unit increases the exhaust gas cleaning efficiency of the catalyzer.

As described above, an exhaust gas cleaning system according to the present invention comprises: a catalyzer provided in the exhaust passage; an adsorbent unit provided in the exhaust passage upstream from the catalyzer; an air supplying unit provided upstream from the adsorbent unit; an oxygen sensor provided near the inlet of the catalyzer; a temperature sensor provided on the adsorbent unit; and a control unit for calculating the amount of air (oxygen) required for catalyzer to clean the unburned hydrocarbons released from the adsorbent unit and for commanding the air supplying unit to supply the required amount of air in response to an initiation signal generated by the temperature sensor when the temperature of the adsorbent unit reaches the level at which the adsorbent unit releases the unburned hydrocarbons. Thus, the adsorbent unit temporarily adsorbs a large amount of unburned hydrocarbons emitted from the engine when the engine is just started. Then, when the temperature of the exhaust gas rises to such a level that the adsorbent unit releases the unburned hydrocarbons, air is supplied in such a manner that the released unburned hydrocarbons will be sufficiently eliminated in the catalyzer. A system according to the present invention will reduce the unburned hydrocarbons emitted into the atmosphere to about one third of that of the conventional exhaust gas cleaning system.

Further, since another exhaust gas cleaning system according to the present invention comprises a catalyzer provided in the exhaust passage, an adsorbent unit provided upstream from the catalyzer, and a flow control means provided in the exhaust passage, the system achieves high efficiency in adsorption of unburned hydrocarbons into the adsorbent unit by reducing the exhaust flow rate when the engine is just started.

While the present invention has been described with reference to what are presently considered to me the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A system for controlling oxygen concentration in an exhaust gas in an exhaust gas cleaning system, said exhaust gas cleaning system comprising a catalyzer for cleaning exhaust gas of an engine, an adsorbent for adsorbing unburned hydrocarbons in said exhaust gas received from the engine and for supplying said exhaust gas to said catalyzer for cleaning, and control means for controlling an amount of air in said exhaust gas supplied to said absorbent to a quantity required to substantially eliminate in said catalyzer unburned hydrocarbons, which are released from said adsorbent, in accordance with the oxygen concentration upstream from said catalyzer and the temperature of said adsorbent.

2. A system for controlling oxygen concentration in exhaust gas according to claim 1, wherein said control means includes means for supplying said amount of air into the exhaust gas cleaning system.

3. A system for controlling oxygen concentration in exhaust gas according to claim 1, wherein said control means includes means for controlling air-fuel ratio in an intake system of the engine.

4. A system for controlling oxygen concentration in exhaust gas according to claim 1, wherein said control means determines the amount of air required by using a detected value of a flow rate of exhaust gas.

5. A system for controlling oxygen concentration in exhaust gas according to claim 1, wherein said control means includes means for controlling said amount of air required by periodically supplying air and discontinuing the supplying of air.

6. An exhaust gas cleaning system comprising:
a catalyzer for cleaning exhaust gas of an engine;
an adsorbent which is provided upstream from said catalyzer and which adsorbs unburned hydrocarbons emitted from the engine immediately after the engine is started;
an oxygen sensor for detecting an oxygen concentration upstream from said catalyzer;
a temperature sensor for detecting a temperature of said adsorbent and outputting an initiation signal when the temperature of said adsorbent reaches a level at which said adsorbent releases the unburned hydrocarbons;
control means, which operates in response to said initiation signal, for calculating an exhaust flow rate based on one of an engine speed and a flow rate of air taken into the engine and for calculating the amount of air necessary for said catalyzer to substantially eliminate said unburned hydrocarbons released by said adsorbent, based on said exhaust flow rate and the oxygen concentration received from said oxygen sensor; and
air supplying means for supplying said amount of air calculated by said control means into said exhaust gas cleaning system upstream from said adsorbent.

7. An exhaust gas cleaning system comprising:
a catalyzer for cleaning exhaust gas of an engine;
an adsorbent which is provided upstream from said catalyzer and which adsorbs unburned hydrocarbons emitted from the engine immediately after the engine is started;
an oxygen sensor for detecting an oxygen concentration upstream from said catalyzer;
a temperature sensor for detecting a temperature of said adsorbent and outputting an initiation signal when the temperature of said adsorbent reaches a level at which said adsorbent releases the unburned hydrocarbons; and
intake control means, which operates in response to said initiation signal, for calculating an exhaust flow rate based on one of an engine speed and a flow rate of air taken into the engine, for calculating an amount of air necessary for said catalyzer to substantially eliminate said unburned hydrocarbons released by said adsorbent, based on said exhaust flow rate and the oxygen concentration received from said oxygen sensor, and for shifting an air-fuel ratio of an intake air-fuel mixture toward an excessive-oxygen state in accordance with said amount of air required.

8. An exhaust gas cleaning system according to claim 6, further comprising means for heating said catalyzer.

9. An exhaust gas cleaning system according to claim 7, further comprising means for heating said catalyzer.

10. An exhaust gas cleaning system according to claim 6, wherein said adsorbent is formed of a plurality of adsorbent materials which differ in the temperatures at which desorption of the unburned hydrocarbons occurs.

11. An exhaust gas cleaning system according to claim 7, wherein said adsorbent is formed of a plurality of adsorbent materials which differ in the temperatures at which desorption of the unburned hydrocarbons occurs.

12. An exhaust gas cleaning system according to claim 8, wherein said adsorbent is formed of a plurality of adsorbent materials which differ in the temperatures at which desorption of the unburned hydrocarbons occurs.

13. An exhaust gas cleaning system according to claim 9, wherein said adsorbent is formed of a plurality of adsorbent materials which differ in the temperatures at which desorption of the unburned hydrocarbons occurs.

14. An exhaust gas cleaning system according to claim 6, further comprising cooling means for cooling said adsorbent so as to slow an increasing rate of change of temperature of said adsorbent in order to delay a desorption of the unburned hydrocarbons from said adsorbent.

15. An exhaust gas cleaning system according to claim 7, further comprising cooling means for cooling said adsorbent so as to slow an increasing rate of change of temperature of said adsorbent in order to delay a desorption of the unburned hydrocarbons from said adsorbent.

16. An exhaust gas cleaning system according to claim 6, wherein said temperature sensor outputs a termination signal when the temperature of said adsorbent reaches a level at which desorption of the unburned hydrocarbons from said adsorbent is completed, and wherein, in response to said termination signal, said control means stops operating.

17. An exhaust gas cleaning system according to claim 7, wherein said temperature sensor outputs a termination signal when the temperature of said adsorbent reaches a level at which desorption of the unburned hydrocarbons from said adsorbent is completed, and wherein, in response to said termination signal, said control means stops operating.

18. An exhaust gas cleaning system comprising:
a catalyzer for cleaning exhaust gas of an engine, said catalyzer containing an adsorbent which adsorbs unburned hydrocarbons emitted from the engine immediately after the engine is started;
an oxygen sensor for detecting an oxygen concentration upstream from said catalyzer;
a temperature sensor for detecting a temperature of said catalyzer and outputting an initiation signal when the temperature of said catalyzer reaches a level at which said adsorbent releases the unburned hydrocarbons;

control means, responsive to said initiation signal, for calculating an exhaust flow rate based on one of engine speed and a flow rate of air taken into the engine and for calculating an amount of air necessary for said catalyzer to substantially eliminate said unburned hydrocarbons released by said adsorbent, based on said exhaust flow rate and the oxygen concentration received from said oxygen sensor; and air supplying means for supplying said amount of air calculated by said control means into said exhaust gas cleaning system upstream from said adsorbent.

19. An exhaust gas cleaning system according to claim 6, further comprising exhaust flow control means, provided downstream from said adsorbent, for reducing the exhaust flow rate immediately after the engine is started.

20. An exhaust gas cleaning system according to claim 7, further comprising exhaust flow control means, provided downstream from said adsorbent, for reducing the exhaust flow rate immediately after the engine is started.

* * * * *